United States Patent [19]

Oosterveen et al.

[11] Patent Number: 5,468,942
[45] Date of Patent: Nov. 21, 1995

[54] DISPENSING DEVICE FOR HAND SCANNERS ACCESSIBLE FROM TWO SIDES

[75] Inventors: Leendert Oosterveen, CH Hoogland; Jacobus H. M. Lombaers, WC Utrecht; Johannes Dorsman, VL Dordrecht, all of Netherlands

[73] Assignee: Ahold Retail Services AG, Klosters, Switzerland

[21] Appl. No.: 229,265

[22] Filed: Apr. 18, 1994

[51] Int. Cl.⁶ .................................................. G06K 15/00
[52] U.S. Cl. .................. 235/383; 235/462; 186/52; 186/61
[58] Field of Search ...................... 235/472, 383, 235/382, 462; 186/52, 59, 61; 312/243, 35, 42, 43, 45, 72, 73, 286, 287

[56] References Cited

U.S. PATENT DOCUMENTS

| | | | |
|---|---|---|---|
| 449,936 | 4/1891 | Jackson | 312/287 |
| 3,749,191 | 7/1973 | Ashen et al. | 177/1 |
| 3,836,755 | 9/1974 | Ehrat | 235/61.7 R |
| 3,878,365 | 4/1975 | Schwartz | 235/61.7 R |
| 4,157,738 | 6/1979 | Nishiguchi et al. | 177/1 |
| 4,180,204 | 12/1979 | Koenig et al. | 235/385 |
| 4,373,133 | 2/1983 | Clyne et al. | 235/383 |
| 4,866,661 | 9/1989 | de Prins | 364/900 |
| 4,929,819 | 5/1990 | Collins | 235/383 |
| 5,294,781 | 3/1994 | Takahashi | 235/376 |
| 5,345,071 | 9/1994 | Dumont | 235/383 |

FOREIGN PATENT DOCUMENTS

| | | | |
|---|---|---|---|
| 0003557 | 8/1979 | European Pat. Off. | A47F 10/00 |
| 0086059 | 8/1983 | European Pat. Off. | G07C 3/14 |
| 0390448 | 10/1990 | European Pat. Off. | G07G 1/00 |
| 8800907 | 11/1989 | Netherlands | G06F 15/24 |
| 1267630 | 3/1972 | United Kingdom | A47F 10/00 |
| 2064184 | 6/1981 | United Kingdom | G06F 7/58 |
| 2068132 | 8/1981 | United Kingdom | G01G 19/413 |
| 2117709 | 10/1983 | United Kingdom | B41J 3/00 |
| 2178576 | 2/1987 | United Kingdom | G07C 15/00 |
| WO8501812 | 4/1985 | WIPO | 235/382 |
| WO89/06406 | 7/1989 | WIPO | G07G 1/14 |

*Primary Examiner*—Donald Hajec
*Assistant Examiner*—Karl D. Frech
*Attorney, Agent, or Firm*—Pennie & Edmonds

[57] ABSTRACT

Dispensing device for hand scanners for use in a self-service store adapted for use of a self-scanning system, wherein the dispensing device comprises an identification device for the customers and a plurality of accommodating elements for hand scanners, the accommodating elements being so positioned that in the operating condition they are accessible from two otherwise separate sections of the store, and store array comprising such dispensing device.

22 Claims, 2 Drawing Sheets

5,468,942

DISPENSING DEVICE FOR HAND SCANNERS ACCESSIBLE FROM TWO SIDES

FIELD OF THE INVENTION

This invention relates to a dispensing device for hand scanners for use in a self-service store adapted for use of a self-scanning system.

BACKGROUND OF THE INVENTION

An example of a self-service store adapted for use of a self-scanning system is disclosed in published U.S. application Ser. No. 08/063,581, and in the corresponding U.S. Pat. No. 5,397,882, incorporated herein by reference In the self-service store described in U.S. application Ser. No. 08/063,581, customers who participate in the self-scanning system can obtain a scanning device (hand scanner) near the entrance of the self-service store, for instance a supermarket, which scanning device may for instance comprise a barcode reader by which the article code provided on or near the articles selected by the customer can be scanned by the customer himself and be stored in the memory of the scanning device.

Before the customer leaves the store, the memory of the scanning device is read out and the amount to be paid by the customer is determined. Upon payment and, if applicable, a spot check to verify the correctness of the data registered in the memory of the scanning device, the customer can leave the store. The scanning device is then handed in again, so that it becomes available to a next customer.

Divers variants of such a self-scanning system are possible and a number of variants are also described in U.S. application Ser. No. 08/063,581. A major advantage of the use of such a self-scanning system is that the waiting times at the checkouts are markedly reduced.

SUMMARY OF THE INVENTION

The object of the present invention is to provide a dispensing device for hand scanners which is especially designed for use in a self-service layout such as a supermarket and which further promotes a smooth processing of the stream of customers.

To realize this object, a dispensing device for hand scanners is characterized, in accordance with the present invention, in that the dispensing device comprises an identification device for the customers and a plurality of accommodating elements for hand scanners, these accommodating elements being so positioned that in operation they are accessible from two otherwise separate parts of the store.

BRIEF DESCRIPTION OF THE DRAWINGS

In the following, the invention will be further explained with reference to the accompanying drawings of an exemplary embodiment.

DETAILED DESCRIPTION OF THE INVENTION

Figure 1:
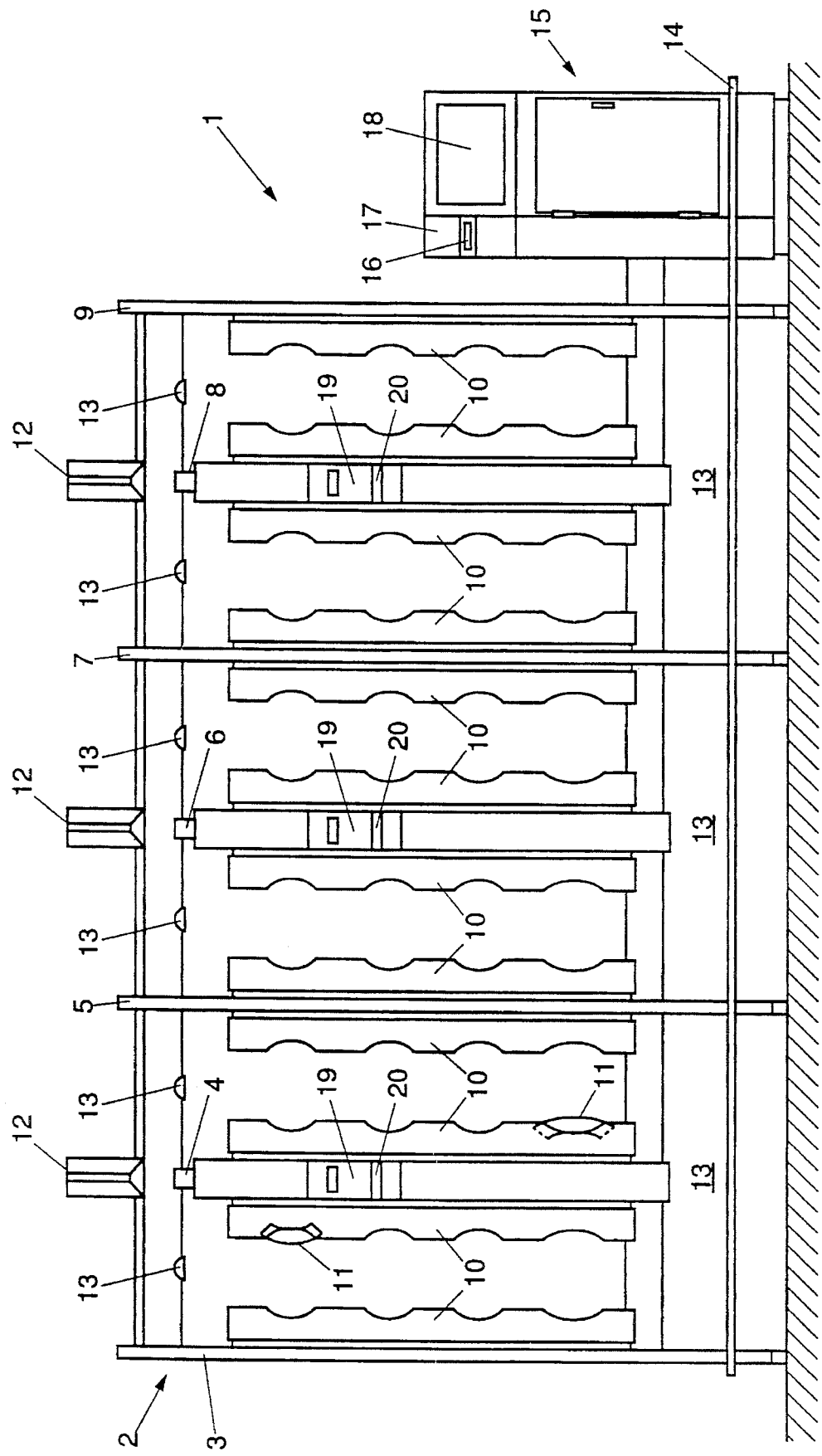
FIG. 1 schematically shows an elevation of an example of a dispensing device according to the invention.

FIG. 1 schematically shows an example of a dispensing device 1 for hand scanners. The dispensing device 1 comprises a rack 2 with a plurality of columns 3 through 9. Each column has two sides extending transversely to the plane of the paper on opposite sides of the column and each side may be provided with a holder for a number of hand scanners. In the example shown, twelve holders 10 are present because the outermost columns 3 and 9 only comprise a holder 10 for hand scanners on the inside. In the example of FIG. 1, each holder has four accommodating cavities for a hand scanner, arranged above each other. Preferably, however, each holder comprises several juxtaposed rows of accommodating cavities for hand scanners. In a practical example, each holder could comprise two rows of four accommodating cavities each, so that each column that is provided with holders on both sides can accommodate sixteen hand scanners. In FIG. 1 two hand scanners placed in the holders 10 of column 4 are depicted diagrammatically at 11.

In the example shown, the columns 3, 5, 7 and 9 function as uprights of the rack 2, whilst the columns 4, 6 and 8 do not perform the function of bearing the rack.

Arranged between and/or on the uprights is a top girder 12 which is preferably provided with lighting means, such as lamps 13, arranged between the columns.

The uprights divide the rack 2 into a plurality of sections which, for reasons to be described hereinafter, are preferably provided with an identifying mark at a properly visible place. For this purpose, it is for instance possible to use top pieces 12', arranged above the columns positioned between pairs of uprights and which may for instance be provided with the designations A, B, C etc.

The above-described rack is accessible from two sides. As a consequence, the rack may form a (part of a) partition between the section of the store which customers can enter and leave freely and the actual shopping section which customers can leave exclusively by way of a settlement device. In that case, the rack can serve not only as a dispensing device for hand scanners to be used but also as a receiving device for used hand scanners. A major advantage of such a configuration is that scanning devices which have been placed back in the dispensing device after use are immediately in the proper position again to be taken out for use by customers who have just entered the store. This renders it unnecessary to transport scanning devices which have been returned by the customers after use from a point where they are handed in to a point where they are dispensed.

The dispensing device forms a partition between the section of the store which customers can leave freely and the display area which customers can leave exclusively by way of a settlement device, for instance a checkout.

To emphasize this function, partitions 14 may be provided at the lower end of the rack 2, which wholly or partly close off the space between the uprights 3, 5, 7, 9. Further, the lower end of the rack is preferably provided with a rail bumper 14' to prevent damage by shopping trolleys.

The dispensing device further comprises an identification device 15. The identification device is capable of determining the identity of a customer and subsequently clearing one of the scanning devices present in the rack for use by that customer.

In the example shown, the identification device is adapted to electronically and/or magnetically recognize a card-shaped pass to be presented by the customer, for instance the customer pass already known from practice. For that purpose, the identification device is provided with a card insertion slot 16 of an automatic identification device or card reader 17. In addition, it is possible, if desired, to arrange a keyboard 17' where the customer can enter a PIN code in the usual manner.

Further, the identification device in the example shown comprises a display device 18, for instance a viewing screen or an LCD screen or the like.

The device described functions as follows. After the customer has inserted the customer pass into the slot 16 of the card reader 17 and, if applicable, has entered the PIN code, the card is read. The card reader is connected with a computer (not shown) in which the particulars of the customers who have a customer pass are stored. When no objections to the clearance of a hand scanner prove to exist, it is indicated on the display device which hand scanner the customer can take from the rack 2 (from the front side). The display device may also display further directions for the use of the hand scanner or other communications the store manager considers desirable. The hand scanner available to the customer in question can be identified, for instance by an indication of the section of the rack where the hand scanner is to be found and, for instance, the number of the accommodating cavity or the like. It is also possible to arrange for a further indication means in the form of a lamp 18' to switch on at or on the hand scanner in question, with or without an indication of the section and/or the number of the accommodating cavity. Only one lamp 18' is shown in FIG. 1 although there will be one for each scanner.

In the case where exclusively lamps or the like are used, the display device could be omitted.

The hand scanners located in the rack are locked and can only be taken from the rack after being unlocked. Under the control of the computer, the hand scanner available to an identified customer is unlocked, for a predetermined period of time to enable the customer to take the hand scanner intended for him or her from the rack.

Preferably, each scanner is provided with a unique identification code which can be detected, with or without contact, by detection means arranged in the rack. The computer then knows which hand scanner has been cleared and also knows the identity of the customer identified by means of the customer pass. At that instant, in the computer memory the identification code of a specific hand scanner is coupled with a specific customer.

After the customer has selected the desired products and has registered the codes thereof in the memory of the hand scanner, the hand scanner can be placed in any free accommodating cavity from the other side (the rear side) of the rack. The re-placed hand scanner is subsequently locked again and the memory content is read out by the computer. Then a receipt is produced by a receipt printer 19, located in this example in at least one of the columns. For convenience, the receipt printer is depicted in FIG. 1 on the same side as the card insertion slot 16, but the slot 20 from which the printed receipt emerges is located on the side of the actual sales area. On the receipt the amount to be paid is printed. It is also possible for a code to be printed thereon, on the basis of which, upon presentation of the receipt at a checkout, it is determined whether a spot check should take place.

Figure 2:
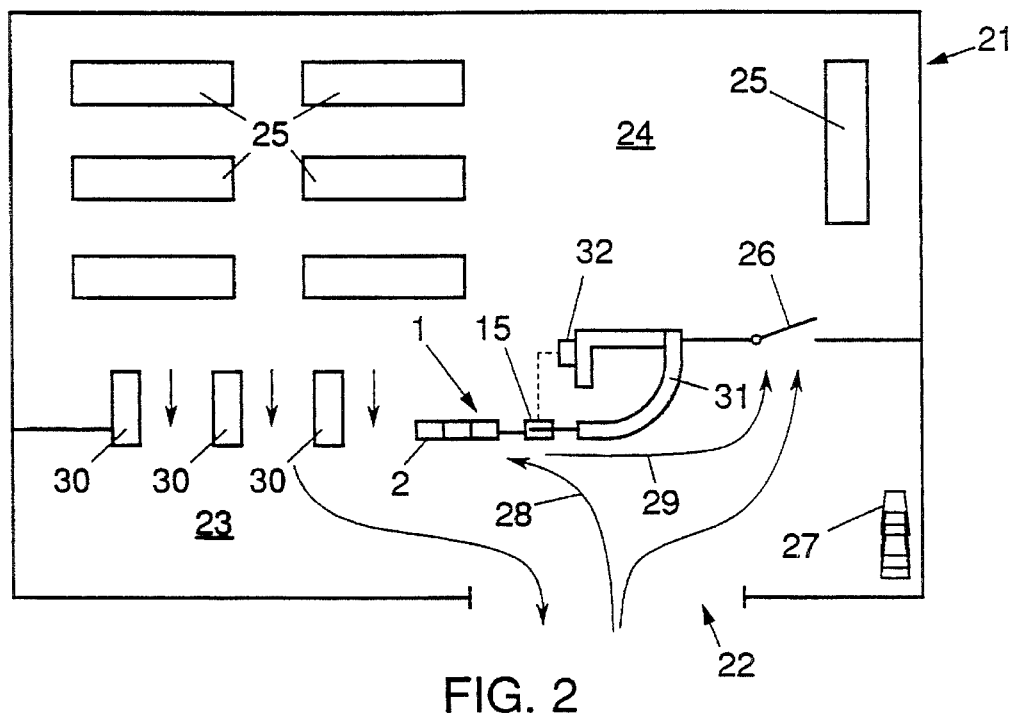
FIG. 2 schematically shows an example of a self-service store comprising a dispensing device according to the invention.

FIG. 2 diagrammatically shows a plan of a store comprising a dispensing device according to the invention.

FIG. 2 shows a store space 21 comprising an entrance/exit 22, a free space or lobby 23 and a display space or the actual sales area 24. The actual sales area conventionally comprises shelves 25 and the like and can be entered by way of one or more entrance gates 26. Shopping trolleys 27 can be taken along.

A customer wishing to make use of the self-scanning system first takes a hand scanner from the dispensing device 1 in the above-described manner and only then does he enter the sales area proper, as indicated with arrows 28, 29. It can be clearly seen that the dispensing device forms a part of the partition between the actual sales area 24 and the lobby 23. The partition further comprises the checkouts 30 and in this example an enquiry counter 31. The computer connected to the dispensing device is shown diagrammatically at 32.

Figure 3:
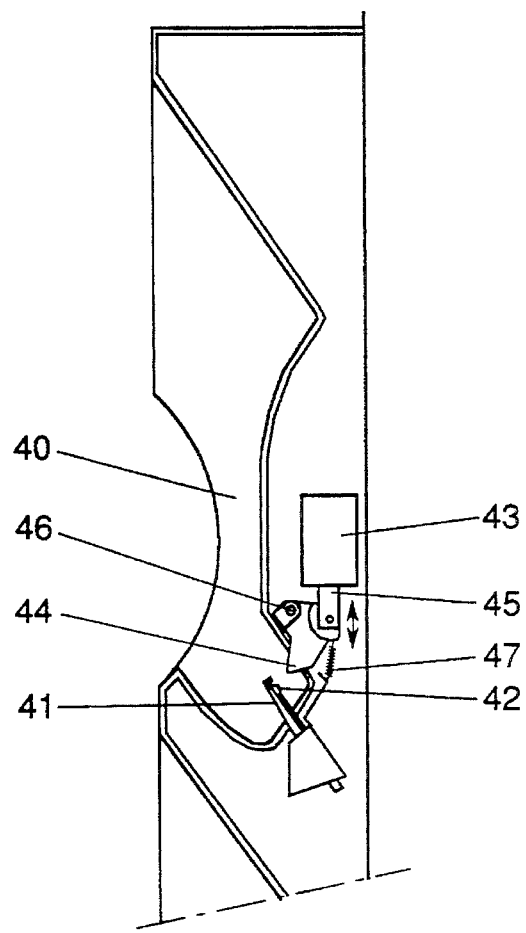
FIG. 3 shows a detail of the dispensing device of FIG. 1.

FIG. 3 diagrammatically shows a cutaway view of a part of a holder 10 at the location of an accommodating cavity for a hand scanner. The cavity has a form adapted to the type of hand scanner used, preferably enclosing entirely the lower end of the hand scanner, as shown. Reaching into the cavity in the example shown is a lug 41 having a detection means comprising a plurality of contacts 42 serving for readout of the memory of the hand scanner and for charging the battery of the hand scanner. At its lower end, the hand scanner is provided with a slot 41' in which contacts 42' are located which come into contact with the contacts 42 of the lug 41 when the hand scanner is placed in a cavity 40.

FIG. 3 further shows a projection defining a locking member 44, lockable and unlockable by means of an electromagnet 43, comprising a driving element in the form of an operating rod 45, a pivot 46 and a drawback spring 47. The locking member is depicted in the extended locking position, in which the operating rod 45 has been moved from a retracted position by the electromagnet 43 to place the locking member 44 in a recess 44' in the housing of a hand scanner 11.

It is noted that after the foregoing various modifications will readily occur to a person of ordinary skill in the art. For instance, the rack may be adapted for contactless read out of the memories of the hand scanners. Possibilities even include contactless charging of the batteries of the hand scanners. The locking of the hand scanners, too, can be practically realized in many ways.

If desired, the identification device 15 may be integrated into the rack 2, whilst the receipt printer, if desired, could be arranged next to the rack as a separate unit.

These and similar modifications are understood to fall within the scope of the present invention.

We claim:

1. A dispensing device for hand scanners for use in a self-service store adapted for use of a self-scanning system, comprising:

a) an identification device for the customers; and b) a plurality of accommodating elements for hand scanners;

c) a rack with front and rear sides and lateral ends, said rack including said accommodating elements for said scanners, said accommodating elements being positioned in said rack so as to be accessible from two otherwise separate sections of the store through the front side and the rear side of said rack, respectively; and d) a plurality of hand-scanners, one of which is positioned in each of at least some of said accommodating elements so that they are each accessible from said two otherwise separate sections of the store through said front side and said rear side of said rack, respectively.

2. A dispensing device according to claims 1, wherein the rack comprises a plurality of columns arranged side by side with an interspace between them, said columns, on the sides facing each other, being provided with holders for one or more hand scanners.

3. A dispensing device according to claim 2, wherein the holders each comprise a plurality of accommodating cavities for accommodating a hand scanner, said accommodating cavities being at least partly open on the side of the holders facing the interspace.

4. A dispensing device according to claim 3, wherein each accommodating cavity comprises controllable locking means for locking or selectively releasing a hand scanner.

5. A dispensing device according to claim 4, wherein the locking means comprise a projection moveable by a driving element, said projection reaching into a recess of a hand scanner in one position of the driving element.

6. A dispensing device according to claim 5, wherein the driving element comprises an electromagnet.

7. A dispensing device according to claim 1, wherein the identification device comprises a display device for displaying information intended for the customer.

8. A dispensing device for hand scanners for use in a self-service store adapted for used of a self-scanning system, comprising:
   a) an identification device for the customers; and
   b) a plurality of accommodating elements for hand scanners;
   c) said accommodating elements being so positioned that in operating condition they are accessible from two otherwise separate sections of the store; and
   d) said accommodating elements comprising contact means communicating with corresponding contacts of a hand scanner when a hand scanner is placed in an accommodating element.

9. A dispensing device according to claim 8, wherein the contact means comprise a lug provided with contacts and extending into an accommodating cavity of each accommodating element.

10. A dispensing device for hand scanners for use in a self-service store adapted for use of a self-scanning system, comprising:
   a) an identification device for the customers; and
   b) a plurality of accommodating elements for hand scanners;
   c) said accommodating elements being so positioned that in operating condition they are accessible from two otherwise separate sections of the store;
   d) said identification device comprising an insertion slot in which a card-shaped customer pass card can be inserted, and a card reader capable of reading information stored on said card; and
   e) said card reader being connected with a computer which in operation processes the information read and subsequently assigns one of the hand scanners present in the dispensing device to the customer.

11. A dispensing device according to claim 10, wherein the identification device comprises a keyboard for entering a PIN code.

12. A dispensing device according to claim 10, wherein the computer, after processing the information read, is capable of providing control signals for unlocking a locking member locking a hand scanner in an accommodating element.

13. A dispensing device for hand scanners for used in a self-service store adapted for use of a self-scanning system, comprising:
   a) an identification device for the customers; and
   b) a plurality of accommodating elements for hand scanners;
   c) said accommodating elements being so positioned that in operating condition they are accessible from two otherwise separate sections of the store;
   d) an open rack with front and rear sides and lateral ends, said rack comprising said accommodating elements for hand scanners and being accessible from both the front side and the rear said; and
   e) said rack further comprising indication means for indicating a specific hand scanner located in the rack.

14. A dispensing device for hand scanners for use in a self-service store adapted for use of a self-scanning system, comprising an open rack with a front side, a rear side and lateral ends, as well as a plurality of columns arranged side by side with an interspace between them, said columns, on the sides facing each other, being provided with holders with accommodating cavities for hand scanners; controllable locking means capable of locking a hand scanner in an accommodating cavity or selectively releasing a hand scanner; detection means for detecting information stored in the memory of a hand scanner; an identification device accessible from the front side of the rack and a receipt printer providing a printed receipt on the rear side of the rack, the identification device, the locking means, the detection means and the receipt printer being connected with a computer.

15. A dispensing device for hand scanners for use in a self-service store adapted for use of a self-scanning system, comprising:
   a) an identification device for the customers;
   b) a plurality of accommodating elements for hand scanners;
   c) said accommodating elements being so positioned that in operating condition they are accessible from two otherwise separate sections of the store;
   d) a computer; and
   e) means for connecting said computer to a hand scanner after said hand scanner has been replaced in one of said accommodating elements to read information in a memory in said hand scanner.

16. A dispensing device according to claim 15, wherein the dispensing device further comprises a receipt printer which, after a hand scanner has been replaced, prints a receipt containing at least information about the amount to be paid by the customer as determined by the information read from said memory in said hand scanner.

17. A self service store system comprising:
   a) an first store section in which customers can leave freely;
   b) a second store section in which goods to be purchased by the customer are displayed and from which customers can leave exclusively by way of a settlement device after payment for said goods;
   c) a dispensing device for hand scanners for use in said second store section for scanning price information for said goods and storing said information;
   d) said dispensing device being positioned between said first and second store sections and isolating said sections from each other, said dispensing device including:
      i) a plurality of accommodating elements for hand scanners, said accommodating elements being so positioned that they are accessible from each of said store sections; and e) a plurality of hand scanners, one of which is positioned in each of at least some of said accommodating elements and accessible from each of said store sections.

18. A store array according to claim 17, wherein the dispensing device is arranged next to a row of checkout units.

19. A store array according to claim 18, wherein the dispensing device is arranged between a row of checkout units and an inquiry counter.

20. A store array according to claim 17, wherein the dispensing device comprises a rack in which the hand scanners can be placed and from which the hand scanners can be taken and wherein an identification device is arranged next to the rack, said identification device forming part of the dispensing device and being operable from the freely accessible section of the store.

21. A store array according to claim 17, wherein the dispensing device is connected with a computer controlling the dispensing device.

22. A dispensing device according to claims 17, wherein said dispensing device includes an identification device for identifying the customers.

* * * * *